(12) United States Patent
Pimplikar et al.

(10) Patent No.: US 11,403,552 B2
(45) Date of Patent: Aug. 2, 2022

(54) COLLABORATIVE COGNITION PLATFORM FOR CREATING AND HOSTING SOCIAL MACHINES

(71) Applicant: International Business Machines Corporation, Armonk, NY (US)

(72) Inventors: Rakesh Pimplikar, Bangalore (IN); Manish Kataria, Bangalore (IN); Ramasuri Narayanam, Bangalore (IN); Gyana Ranjan Parija, New Delhi (IN); Udit Sharma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 16/120,556

(22) Filed: Sep. 4, 2018

(65) Prior Publication Data

US 2020/0074350 A1 Mar. 5, 2020

(51) Int. Cl.
| | |
|---|---|
| *G06N 20/00* | (2019.01) |
| *G06Q 10/10* | (2012.01) |
| *G06N 3/00* | (2006.01) |
| *G06F 9/54* | (2006.01) |
| *G06N 5/02* | (2006.01) |

(52) U.S. Cl.
CPC ............ *G06N 20/00* (2019.01); *G06N 3/006* (2013.01); *G06Q 10/101* (2013.01); *G06F 9/547* (2013.01); *G06N 5/022* (2013.01)

(58) Field of Classification Search
None
See application file for complete search history.

(56) References Cited

U.S. PATENT DOCUMENTS

| | | |
|---|---|---|
| 9,224,126 B2 | 12/2015 | Vaidya et al. |
| 2012/0005131 A1* | 1/2012 | Horvitz ............... G06Q 10/06 706/11 |
| 2014/0279802 A1 | 9/2014 | Harrington et al. |

(Continued)

OTHER PUBLICATIONS

Smart, Paul, Elena Simperl, and Nigel Shadbolt. "A taxonomic framework for social machines." Social collective intelligence. Springer, Cham, 2014. 51-85. (Year: 2014).*

(Continued)

*Primary Examiner* — Vincent Gonzales
(74) *Attorney, Agent, or Firm* — Ryan, Mason & Lewis, LLP

(57) ABSTRACT

Methods, systems, and computer program products for a collaborative cognition platform for creating and hosting social machines are provided herein. A computer-implemented method includes creating a social machine for collaborative tasks, wherein the social machine comprises (i) one or more human agents, (ii) one or more machine-based agents, (iii) an algorithm, and (iv) a set of rules prescribed for executing the collaborative tasks. The method also includes generating one or more collaborative resolutions for the collaborative tasks by executing, in an automated fashion, the collaborative tasks via implementation of the algorithm, wherein the algorithm facilitates, in accordance with the set of rules, systematic iterations of collaboration among (i) the one or more human agents and (ii) the one or more machine-based agents. Further, the method includes outputting the one or more collaborative resolutions to at least one user.

20 Claims, 10 Drawing Sheets

(56) References Cited

U.S. PATENT DOCUMENTS

| | | |
|---|---|---|
| 2015/0039548 A1 | 2/2015 | Mills et al. |
| 2016/0205697 A1 | 7/2016 | Tan et al. |
| 2016/0320956 A9 | 11/2016 | Rosenberg |
| 2017/0155601 A1 | 6/2017 | Ellis et al. |

OTHER PUBLICATIONS

Kulkarni, Anand, Matthew Can, and Björn Hartmann. "Collaboratively crowdsourcing workflows with turkomatic." Proceedings of the acm 2012 conference on computer supported cooperative work. 2012. pp. 1003-12. (Year: 2012).*

Huang, Eric, et al. "Toward automatic task design: A progress report." Proceedings of the ACM SIGKDD workshop on human computation. 2010. pp. 77-85. (Year: 2010).*

Khargharia, Bithika, Salim Hariri, and Mazin S. Yousif. "Autonomic power and performance management for computing systems." Cluster computing 11.2 (2008): 167-181. (Year: 2008).*

Chopra, Amit K., and Munindar P. Singh. "From social machines to social protocols: Software engineering foundations for sociotechnical systems." Proceedings of the 25th International Conference on World Wide Web. 2016. (Year: 2016).*

Battle R, Benson E. Bridging the semantic Web and Web 2.0 with representational state transfer (REST). Journal of Web Semantics. Feb. 1, 2008;6(1):61-9. (Year: 2008).*

Nascimento LM. SMADL—The social machines architecture description language. PhD Thesis, Universidade Federal de Pernambucu, Centro de Informatica. 2014. 181 pages. (Year: 2014).*

Papapanagiotou et al., Social Machines for All, Proc. of the 17th International Conference on Autonomous Agents and Multiagent Systems (AAMAS 2018), Jul. 10-15, 2018.

Max Van Kleek et al., Social Personal Data Stores: The Nuclei of Decentralised Social Machines, SOCM2015 2015.

* cited by examiner

COLLABORATIVE COGNITION PLATFORM FOR CREATING AND HOSTING SOCIAL MACHINES

FIELD

The present application generally relates to information technology and, more particularly, to collaborative process execution.

BACKGROUND

A social machine refers to an environment that includes one or more humans and one or more elements of automated technology interacting, wherein such interactions generate actions and/or outputs which would not be possible without both the human and machine-based parties involved. Generally, every agent (either human or machine-based) in a social machine has a pre-defined role, and depending on the roles and interaction arrangement, the agents can either cooperate or compete with each other.

However, in existing approaches, social machines are typically created for a specific and static task or process, thereby limiting the functionality and adaptability of such collaborations.

SUMMARY

In one embodiment of the present invention, a collaborative cognition platform for creating and hosting social machines is provided. An exemplary computer-implemented method can include creating a social machine for one or more collaborative tasks, wherein the social machine comprises (i) one or more human agents, (ii) one or more machine-based agents, (iii) at least one algorithm, and (iv) a set of rules prescribed for executing the one or more collaborative tasks. Such a method can also include generating one or more collaborative resolutions for the one or more collaborative tasks by executing, in an automated fashion, the one or more collaborative tasks via implementation of the at least one algorithm, wherein the at least one algorithm facilitates, in accordance with the set of rules, systematic iterations of collaboration among (i) the one or more human agents and (ii) the one or more machine-based agents. Further, such a method also includes outputting the one or more collaborative resolutions to at least one user.

In another embodiment of the invention, an exemplary computer-implemented method can include executing, in an automated fashion, the one or more collaborative tasks via implementation of systematic iterations of collaboration among (i) the one or more human agents and (ii) the one or more machine-based agents, wherein the systematic iterations of collaboration comprise: a first iteration comprising an initial opinion attributed to each agent in the social machine; and one or more subsequent iterations comprising one or more revised opinions attributed to each agent in the social machine, wherein each of the revised opinions is based on at least one of (i) one or more instances of collaborative learning through peer influence within the social machine and (ii) one or more instances of online intrinsic learning via one or more observed signals from at least one online source external to the social machine. Such a method can also include generating a span of collaborative opinion for the one or more collaborative tasks based at least in part on the systematic iterations of collaboration, and outputting the span of collaborative opinion to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes generating and/or implementing a collaborative cognition platform for creating and hosting social machines. In one or more embodiments of the invention, such a platform can be implemented to create and host a social machine, such that agents (both human and machine-based) can join and collaborate (in an automated fashion). Additionally, such an embodiment can include onboarding one or more predictive and/or prescriptive models as agents onto the platform.

At least one embodiment of the invention can include generating an automated decentralized solution to a task through systematic collaboration among agents participating in a social machine hosted using a collaborative cognition platform. Such an embodiment includes customizing the rules of execution with respect to a set of collaborative tasks utilizing a task framework that defines the social machine. Additionally, such an embodiment includes hosting an algorithm (such as a predictive algorithm and/or a prescriptive algorithm) as an agent in the social machine by utilizing an agent framework providing a common mechanism for creating an agent. One or more embodiments of the invention also include enforcing one or more constraints (such as memory constraints, time constraints, energy constraints, etc.) via the agent algorithm to produce a collaborative result and/or action for the collaborative task. Moreover, such an embodiment includes executing the collaborative task in an automated fashion, facilitating collaboration among human and autonomous agents (for example, using one or more game theoretic approaches).

Figure 1:
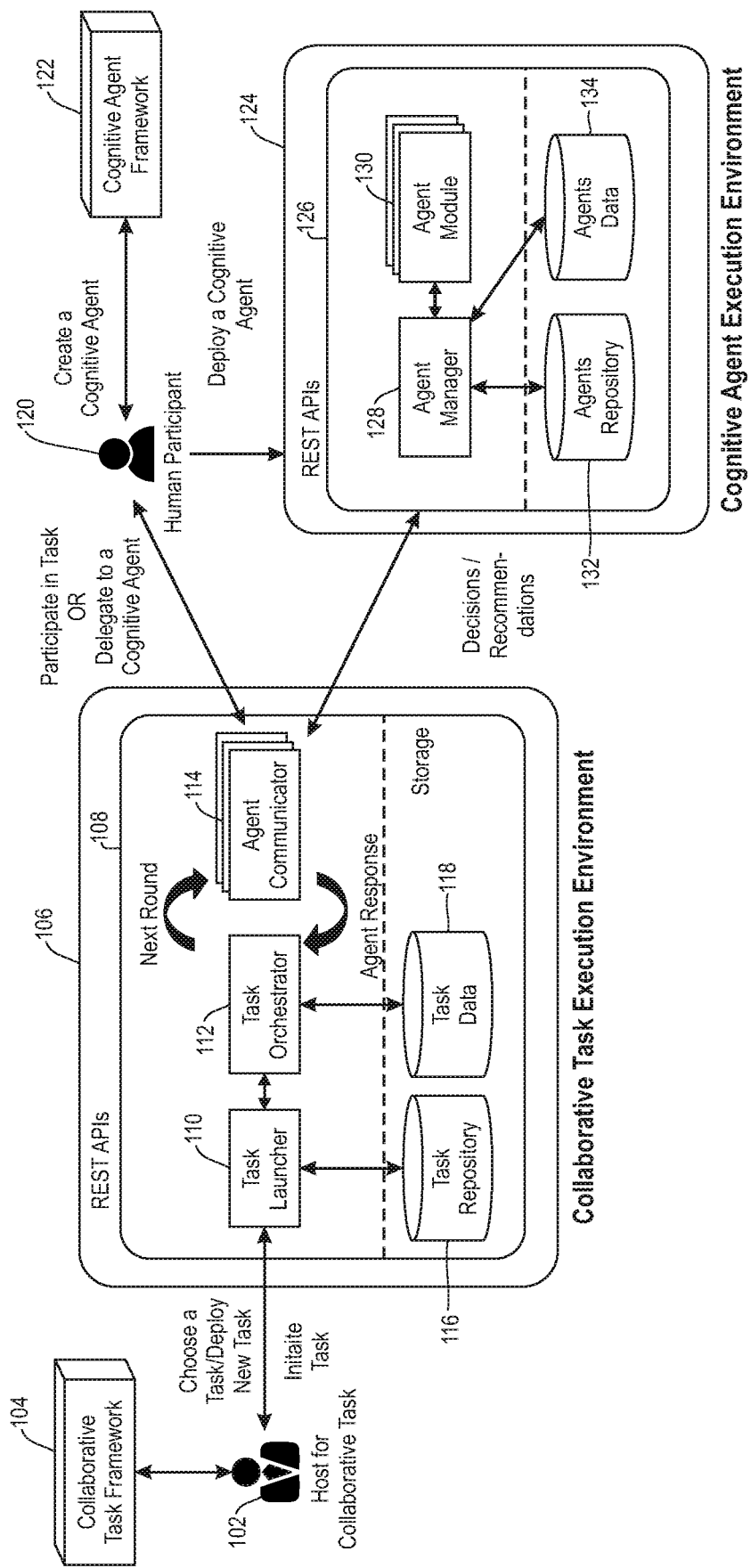
FIG. 1 is a diagram illustrating collaborative cognition (CC) platform architecture, according to an embodiment of the invention.

FIG. 1 is a diagram illustrating collaborative cognition platform architecture, according to an embodiment of the invention. By way of illustration in FIG. 1, a designated host 102 for a task can begin such a task (leveraging representational state transfer (REST) application programming interfaces (APIs)) and configure all participants for the task. At this stage, each participant can accept the invitation, reject the invitation, or delegate the invitation to a software agent. A designated task orchestrator 112 monitors the initial and iterative inputs from all participating agents, and controls events such as the start and end of an iteration. Additionally, the task orchestrator 112 is also responsible for monitoring if the task's convergence criterion (if one has been configured in the task set-up) has been met, and whether the task collaboration should be stopped or continue into a next round of iteration, wherein results/predictions from past iterations are communicated to all agents.

As also illustrated in FIG. 1, collaborative task framework 104 facilitates creation of a social machine by helping a human to define the rules and constraints of the social machine. Host 102 can be a human who uses collaborative task framework 104 to create a social machine. Additionally, collaborative task execution environment 106 represents where a social machine is hosted by host 102, and the collaborative task execution environment 106 enables communication among agents, facilitating their participation in the social machine. Task launcher 110 is a component of the collaborative task execution environment 106 which initiates the execution of a social machine, and task orchestrator 112 is a component of the collaborative task execution environment 106 which acts as an orchestrator, sequencing different steps in a social machine. Agent communicator 114 is a component of the collaborative task execution environment 106 which acts as a communicator with human and machine agents. For example, agent communicator 114 can pass knowledge/information to agents and receive knowledge/information from agents. Tasks repository 116 is a component of the collaborative task execution environment 106 which stores the descriptions of social machines for subsequent use, and task data database 118 is a component of the collaborative task execution environment 106 which stores running information of a social machine, keeping track of different activities happening within the social machine. Additionally, component 108 represents a wrapper around the functionalities provided by components 110, 112, 114, 116 and 118, to expose those components as REST APIs or Web Services.

As also depicted in FIG. 1, cognitive agent framework 122 is a framework that facilitates creation of a cognitive (machine) agent by helping a human to define the underlying agent behavior model. Participant 120 is a human who uses the cognitive agent framework 122 to create a cognitive agent which can represent him or her in a social machine. This avoids direct participation of the human 120 in a social machine. Additionally, human participant 120 can also choose to participate directly in a social machine, facilitated by the collaborative task execution environment 106. If human participant 120 creates a cognitive agent using cognitive agent framework 122, he or she can deploy the cognitive agent into cognitive agent execution environment 124 so that the cognitive agent runs as an autonomous agent and participates in a social machine. Also, in the cognitive agent execution environment 124, anybody can deploy a cognitive agent to make the cognitive agent run as an autonomous agent and participate in a social machine.

Further, agents manager 128 manages execution of one or more agents running in parallel inside the cognitive agent execution environment 124. Agent module 130 is the module wherein actual agent execution occurs, and agents repository 132 is the repository wherein a set of pre-defined agents are stored and are made accessible to the agents manager 128. An agents data database 134 stores agent-specific activities that each agent performs in a social machine, and component 126 represents a wrapper around the functionalities provided by components 128, 130, 132 and 134 to expose the components as REST APIs or Web Services.

Accordingly, as depicted in FIG. 1, host 102 interacts with the collaborative task execution environment 106 to deploy a social machine and read the periodic status of the social machine. Human participant 120 interacts with the collaborative task execution environment 106 to share his or her actions to be performed in a social machine, or he or she can delegate his or her role to an agent deployed in the cognitive agent execution environment 124. Cognitive agents running inside the cognitive agent execution environment 124 interact with the collaborative task execution environment 106 to share their actions to be performed in a social machine, and both human participant 120 and cognitive agents running inside 124 can also provide their knowledge to a social machine running in the collaborative task execution environment 106.

As detailed herein in connection with one or more embodiments of the invention, a collaborative cognition platform hosts social machines and agents, and generates an automated decentralized solution to a task through systematic collaboration among the agents. Additionally, in one or more embodiments of the invention, any number of agents can participate in a social machine via a collaborative cognition platform.

Specifically, a collaborative cognition platform, in accordance with at least one embodiment of the invention, includes a task framework that defines a social machine by prescribing the rules of execution for a set of one or more collaborative tasks. Such a platform also includes an agent framework, which can host an algorithm (for example, a predictive algorithm and/or a prescriptive algorithm) as an agent in a social machine. Such an algorithm can include a common and/or consistent mechanism for creating an agent, such that the created agent can communicate with other agents and evolve during the collaboration process within the social machine.

Figure 2:
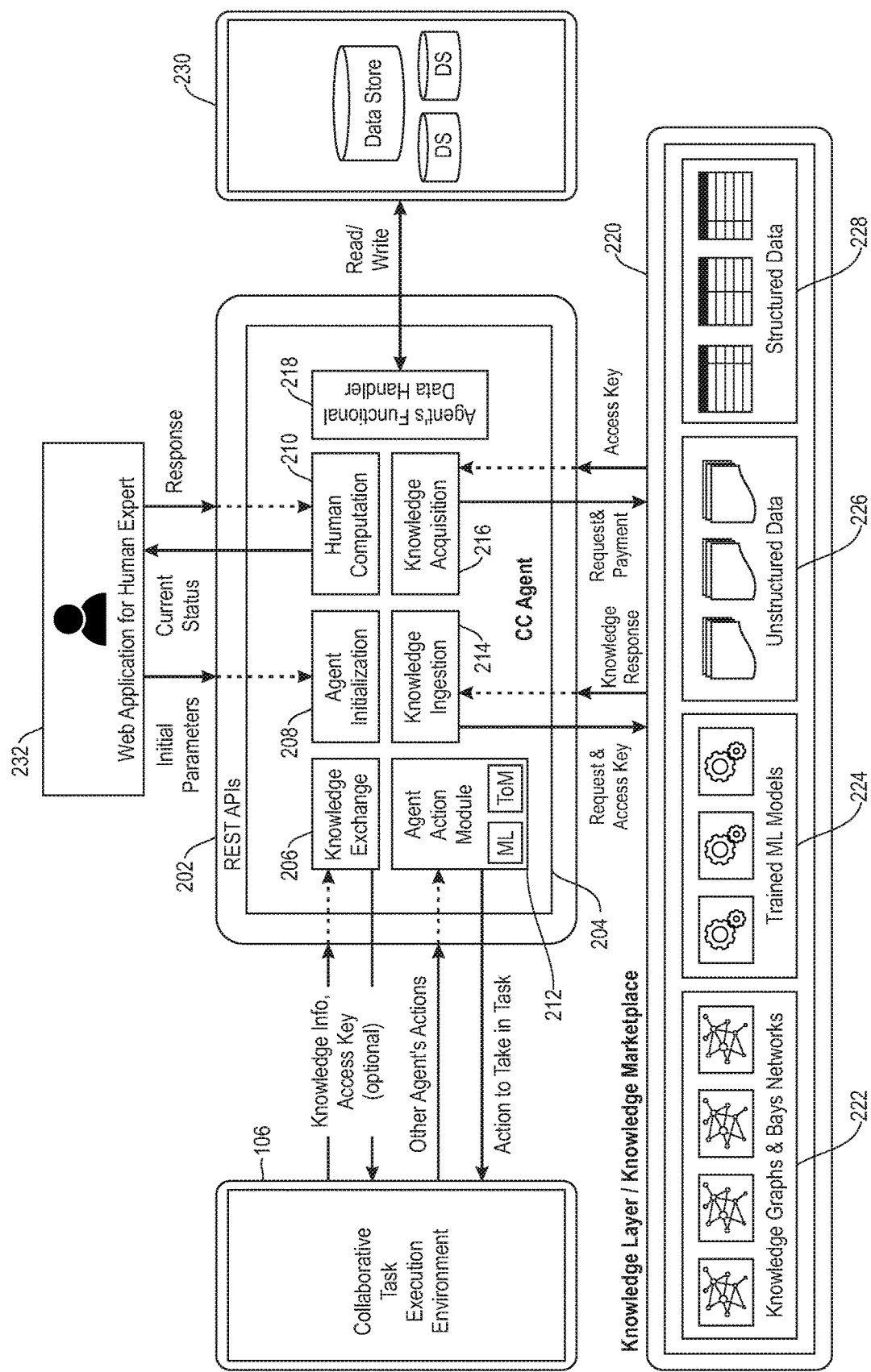
FIG. 2 is a diagram illustrating collaborative cognition agent architecture, according to an exemplary embodiment of the invention.

Note that an algorithm hosted as an agent, as detailed herein, is synonymous with a machine agent. By way of example, FIG. 2 provides a detailed architecture for hosting an algorithm as an agent. As shown in FIG. 2, a human provides an algorithm, and additional machinery is needed to make that algorithm run as an agent. Such machinery can be provided, for example, by agent infrastructure (which can be a part of the collaborative cognition platform as indicated by component 124 in FIG. 1).

Additionally, such a platform can include a cognitive architecture that enforces one or more constraints (such as memory constraints, time constraints, energy constraints, etc.) on the agent algorithm to produce the best possible action and/or task resolution. Such constraints can be set, for example, by the owner of the collaborative task. Also, the "best possible action and/or task resolution" noted above can refer, for example, to the best action an agent can take while adhering to the specified constraints on memory it can consume, time it can take, energy it can consume, etc.

Further, such a platform can also include a task environment, which executes the collaborative task in an automated fashion, facilitating collaboration among the agents within the social machine. In one or more embodiments of the invention, such execution of the collaborative task can include using one or more game theoretic approaches. For example, the method sequence along with equations 606-1, 606-2 and 606-3 in FIG. 6 serves as an example of game theoretic approaches.

FIG. 2 is a diagram illustrating collaborative cognition agent architecture, according to an exemplary embodiment of the invention. By way of illustration, FIG. 2 depicts a collaborative cognition agent architecture 202, which can be used to host an algorithm as an agent which can participate in a social machine. A human expert 232 provides an algorithm and initial parameters for agent behavior, while agent initialization component 208 consumes input from human expert 232 to initialize an agent in the collaborative cognition agent architecture 202. As detailed herein, the collaborative cognition agent architecture 202 provides an environment for agents to run and participate in a social machine.

Knowledge ingestion module 214 fetches the necessary knowledge required for agent execution from a knowledge marketplace 220. Knowledge acquisition module 216 helps an agent to acquire access to new knowledge in the knowledge marketplace 220 by making one or more appropriate payments. Knowledge exchange module 206 enables an agent to share its knowledge with other agents participating in the same social machine. Additionally, agent action module 212 hosts the algorithm submitted by human expert 232, which enables an agent to take actions in a social machine. Human computation module 210 enables an agent to consult its human counterpart 232 if the agent is not able to decide which action to take with a sufficient confidence level. An agent's functional data handler 218 handles an agent's activity data by storing and loading data from a data store 230. Modules 206, 208, 210, 212, 214, 216 and 218 are provided as part of the collaborative cognition agent architecture 202, so that human expert 232 need not worry about such functionalities. The human expert 232 merely provides an algorithm and the collaborative cognition agent architecture 202 runs algorithm as an agent. CC agent 204 exposes framework functionalities as REST APIs or Web Services. As also depicted in FIG. 2, knowledge graphs and Bayes networks 222, trained machine learning (ML) models 224, unstructured data 226 and structured data 228 represent different types of knowledge nuggets which can be made available through the knowledge marketplace 220.

Figure 3:
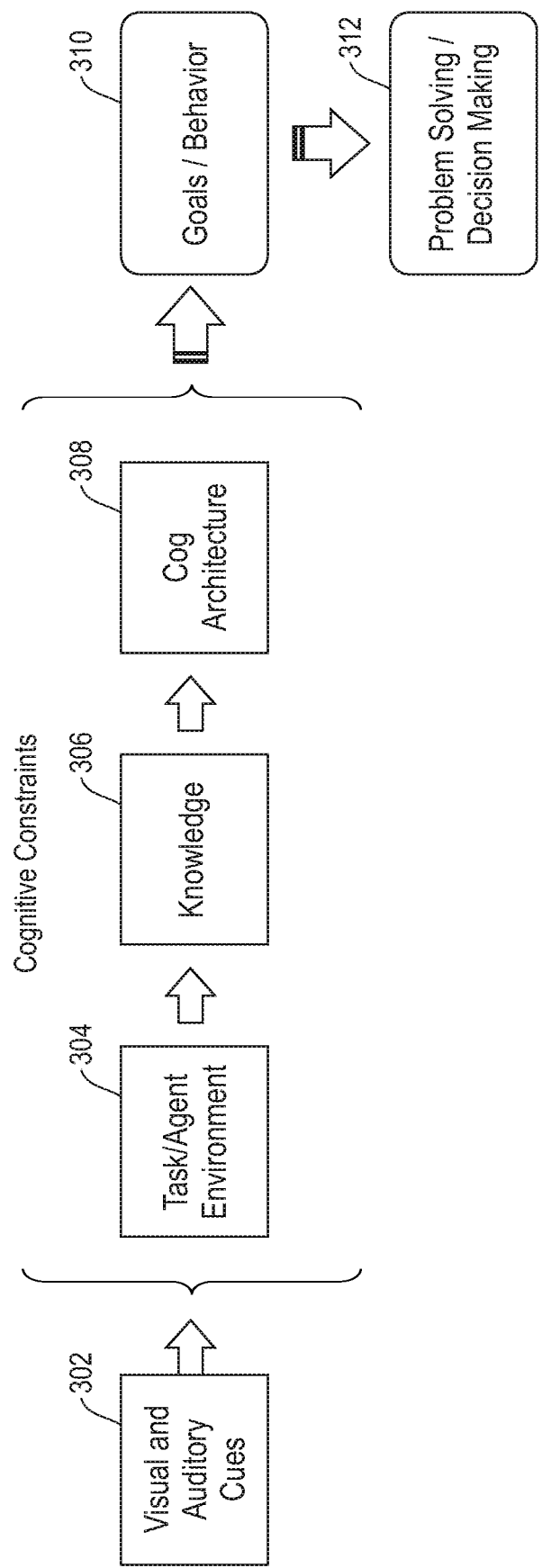
FIG. 3 is a diagram illustrating socio-cognitive architecture to support real-time decision-making by agents, according to an exemplary embodiment of the invention.

FIG. 3 is a diagram illustrating socio-cognitive architecture to support real-time decision-making by agents, according to an exemplary embodiment of the invention. By way of illustration, FIG. 3 depicts a set of visual and auditory cues 302, which are provided to a set of cognitive constraints 304, 306 and 308. The visual and auditory cues 302 can include internal and external (to the social machine) data sources, compliance rules and/or regulations, event notifications, market reports, etc. Also, as illustrated in FIG. 3, the cognitive constraints include task and/or agent environment 304, a knowledge component 306, and cog architecture 308. The task and/or agent environment 304 can be defined, for example, by the collaborative task framework 104 depicted in FIG. 1 as a set of rules and constraints which become part of a social machine. An agent is required to act within the boundaries of this environment. The knowledge component 306 can include machine learning (ML) and/or deep learning capabilities, ontologies and/or taxonomies, knowledge graphs, business rules and policies, etc. Further, the cog architecture 308 can include roles, personas, and multi-agent systems, behavioral and platform capabilities, human-computer/machine interaction parameters, cognitive dashboards, chatbots and/or conversation systems, etc.

Visual and auditory cues 302 represent one or more diverse sets of inputs that an agent receives, and on which an agent eventually acts. Additionally, in one or more embodiments of the invention, every agent has a utility to maximize given a set of inputs 302. Components 304, 306 and 308 enforce different types of constraints on an agent, which the agent should take into account before deciding on any action 310. As described herein, component 304 enforces certain rules and constraints of a social machine, component 306 enforces certain constraints on the knowledge to which an agent can have access, and component 308 enforces constraints on memory, time, energy, etc.

As also depicted in FIG. 3, the cognitive constraints (304, 306 and 308) generate an output 310 in the form of one or more goals and/or behaviors, and such an output 310 is subsequently utilized by a problem solving and/or decision making mechanism 312. In one or more embodiments of the invention, the one or more goals and/or behaviors output 310 can indicate the final objective of the underlying collaborative task among the agents. Examples of such goals and/or behavior can include "consensus among the participating agents," "80% common agreement among the participating agents," etc. Further, the problem solving and/or decision making mechanism 312 can describe the set of rules of the underlying method by which agents engage in the collaborative decision making process in order to reach the pre-defined goals and/or behaviors output 310. An example of such a decision making mechanism is represented by equations 606-1, 606-2 and 606-3 in FIG. 6.

Figure 4:
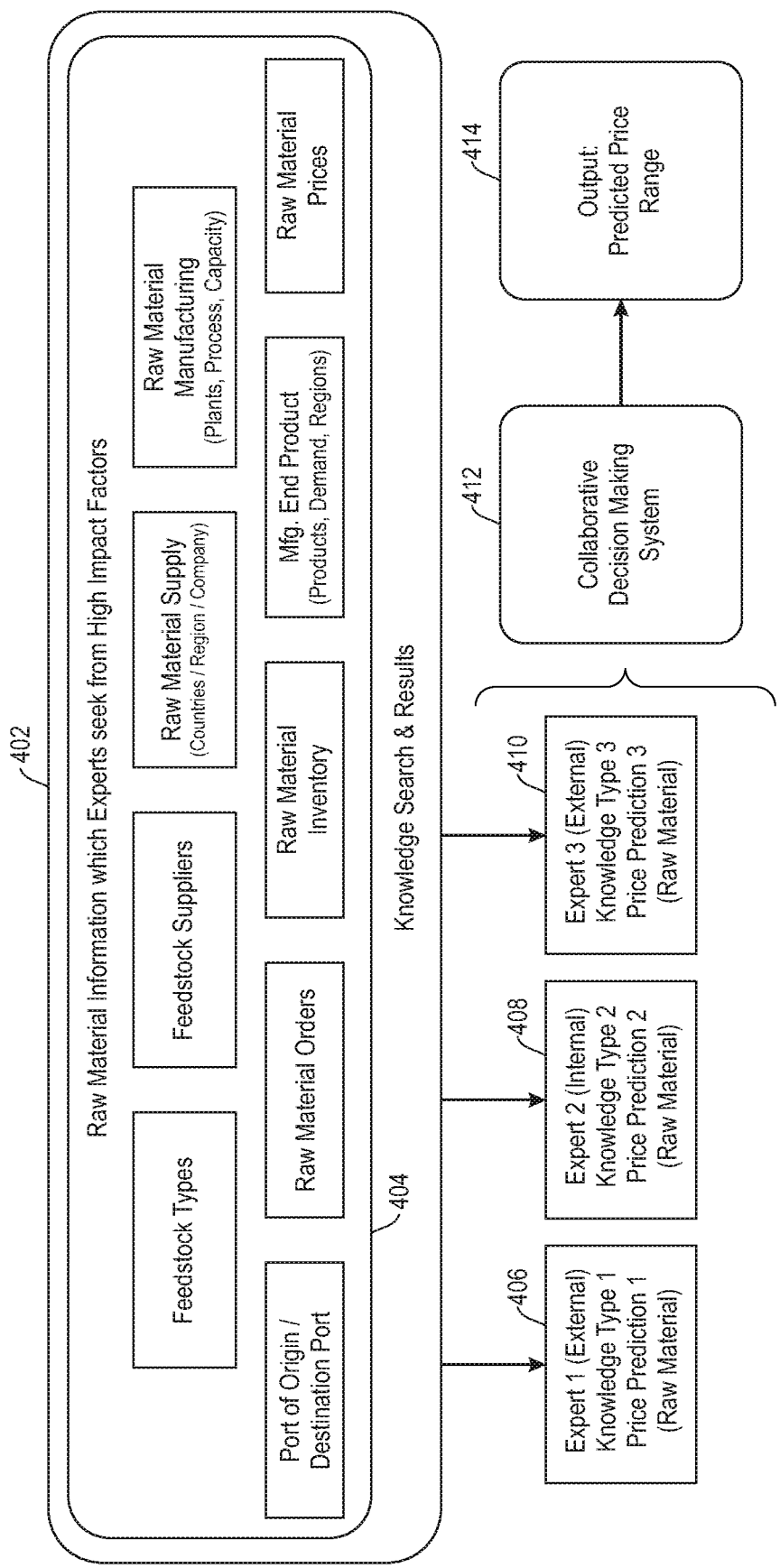
FIG. 4 is a diagram illustrating an example use case scenario, according to an exemplary embodiment of the invention.

FIG. 4 is a diagram illustrating an example use case scenario, according to an exemplary embodiment of the invention. By way of illustration, FIG. 4 depicts knowledge search and results 402, which include raw material information 404 which experts seek from high-impact factors. In the example depicted in FIG. 4, the raw material 404 includes feedstock types, feedstock suppliers, raw material supply, raw material manufacturing information, ports of origin and/or destination ports, raw material orders, raw material inventory, manufacturing end products, raw material prices, etc.

As also depicted in FIG. 4, the knowledge search and results 402 are provided to experts 406, 408 and 410. Each of the knowledge "types" associated with experts 406, 408 and 410 can represent knowledge derived from data belonging to different sub-sets of the high impact factors. For instance, Knowledge Type 1 can be derived from "feedstock types, port of origin, and feedstock suppliers," Knowledge Type 2 can be derived from "raw material inventory, raw material orders, and raw material supply," while Knowledge Type 3 can be derived from "raw material manufacturing, and raw material prices." Additionally, experts 406, 408 and 410 provide price predictions to a collaborative decision making system/platform 412, which generates an output 414 in the form of a predicted price range for the relevant raw materials.

By way of further illustration and example, consider a scenario wherein there is a set of independent agents who are part of a social machine. Initially, at time t1, each agent receives a signal that helps to build his or her own intrinsic opinion, wherein this opinion is in the form of (i) a point estimate (with a corresponding confidence value, for example) or (ii) a probability distribution (with a corresponding confidence value, for example). At least one embodiment of the invention includes facilitating collaborative learning, wherein agents communicate with their peers in order to obtain signals that help form their collaboratively emerged opinion. Additionally, such an embodiment also includes facilitating online individual learning. For example, at multiple subsequent time periods (for example, t2, t3, . . . , tn), the agents can receive new signals from external sources (online sources, for example) which help and/or influence the agents to revise and/or reinforce their intrinsic opinions.

Accordingly, at least one embodiment of the invention includes developing and implementing a multi-agent collaborative decision-making framework to determine the span of collaborative opinions among agents, while accommodating both collaborative opinion learning (through peer influence) and online intrinsic opinion learning (by observing signals from external sources in an online fashion) by the agents.

Figure 5:
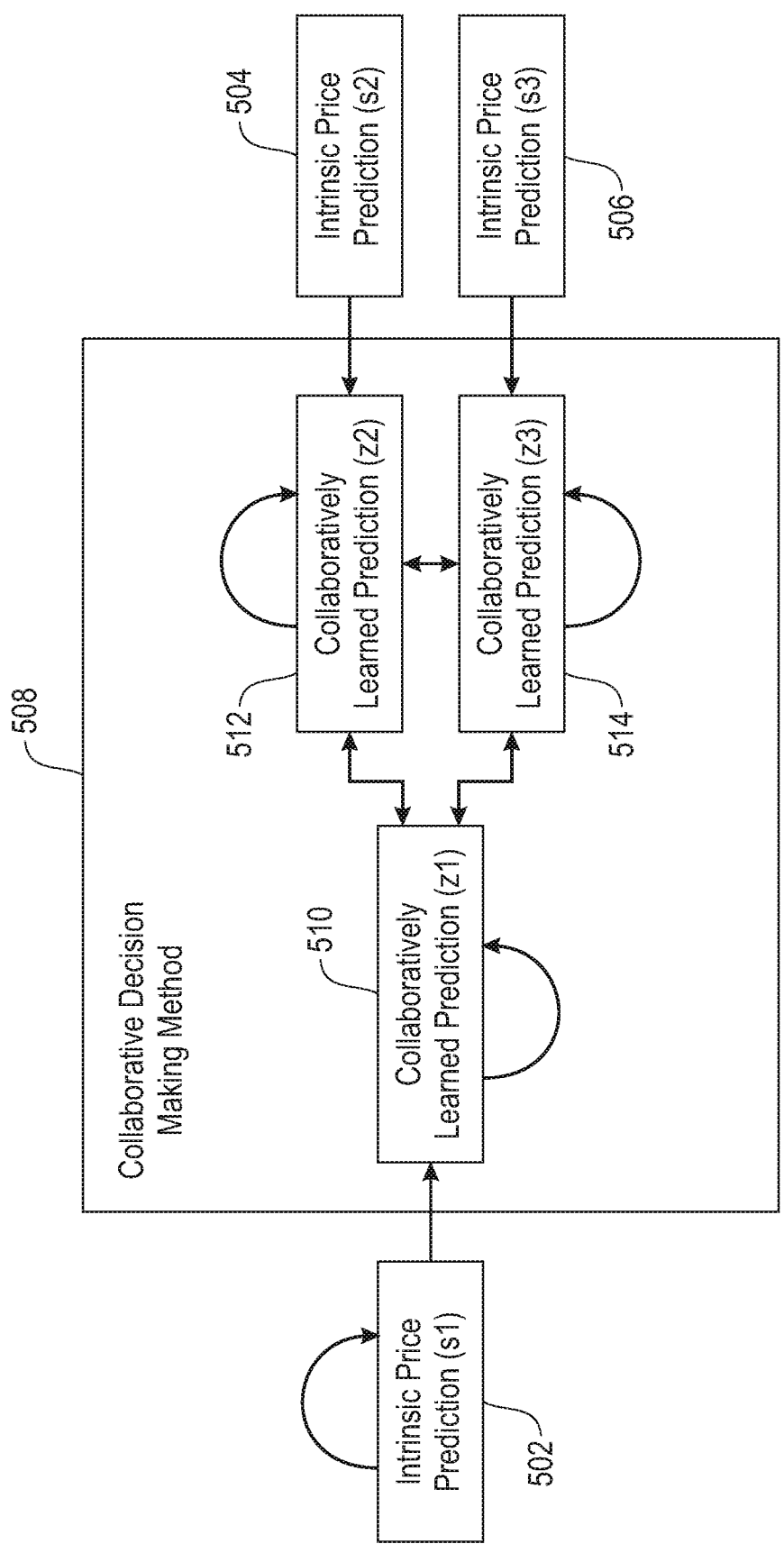
FIG. 5 is a diagram illustrating an example use case implementation workflow, according to an exemplary embodiment of the invention.

FIG. 5 is a diagram illustrating an example use case implementation workflow, according to an exemplary embodiment of the invention. By way of illustration, FIG. 5 depicts a collaborative decision making method 508, as well as a first intrinsic price prediction (s1) 502, a second intrinsic price prediction (s2) 504, and a third intrinsic price prediction (s3) 506. For example, intrinsic price predictions 502, 504 and 506 can each represent continuous learning from the respective agent's own knowledge and/or one or more external sources. As also depicted in FIG. 5, the collaborative decision making method 508 includes steps 510, 512 and 514. Step 510 includes continuous learning of collaboratively learned prediction "z1" using intrinsic prediction 502 and other agents' collectively formed predictions (z2 and z3). Step 512 includes continuous learning of "z2" using intrinsic prediction 504 and other agents' collectively formed predictions (z1 and z3). Additionally, step 514 includes continuous learning of "z3" using intrinsic prediction 506 and other agents' collectively formed predictions (z1 and z2).

Accordingly, in one or more embodiments of the invention, each agent in the social machine updates its collaboratively developed opinion (such as a price prediction) based on the agent's own intrinsic prediction and the (collaboratively formed) predictions of the other agents. During the course of interaction among agents, agents may also learn about new data sources and features being used by other agents, and the agents may utilize this collaboratively-acquired knowledge to revise their intrinsic opinions (for example, price predictions).

By way of example, one or more embodiments of the invention include implementing a model of collaborative opinion dynamics. In such an embodiment, the agents in the social machine are experts in the relevant subject matter, and the new and/or revised opinions of one or more of the agents can be obtained by averaging that agent's own intrinsic opinion and the opinions of the other agents. Additionally, in such an embodiment, each agent has a private utility component and a public utility component. Agents may interact with each other in accordance with the rules of the social machine. For example, by way of illustration, assume agent i's initial intrinsic opinion is $S_i$, and agent i's collaboratively updated opinion is This collaboratively updated opinion of player i can represent a compromise between the persistent value $S_i$ f and the express predictions of other experts/agents $w_{i,j}$. In such an example, w represents the weight of the connection between agent i and agent j. Such weights can be derived, for example, by using the specific data sources or by using a confidence score. The weights can also be normalized. Additionally, if there are no additional data available to derive the weights, and no information on confidence scores, then it can be assumed that all weights are the same (for example, a value of one).

Figure 6:
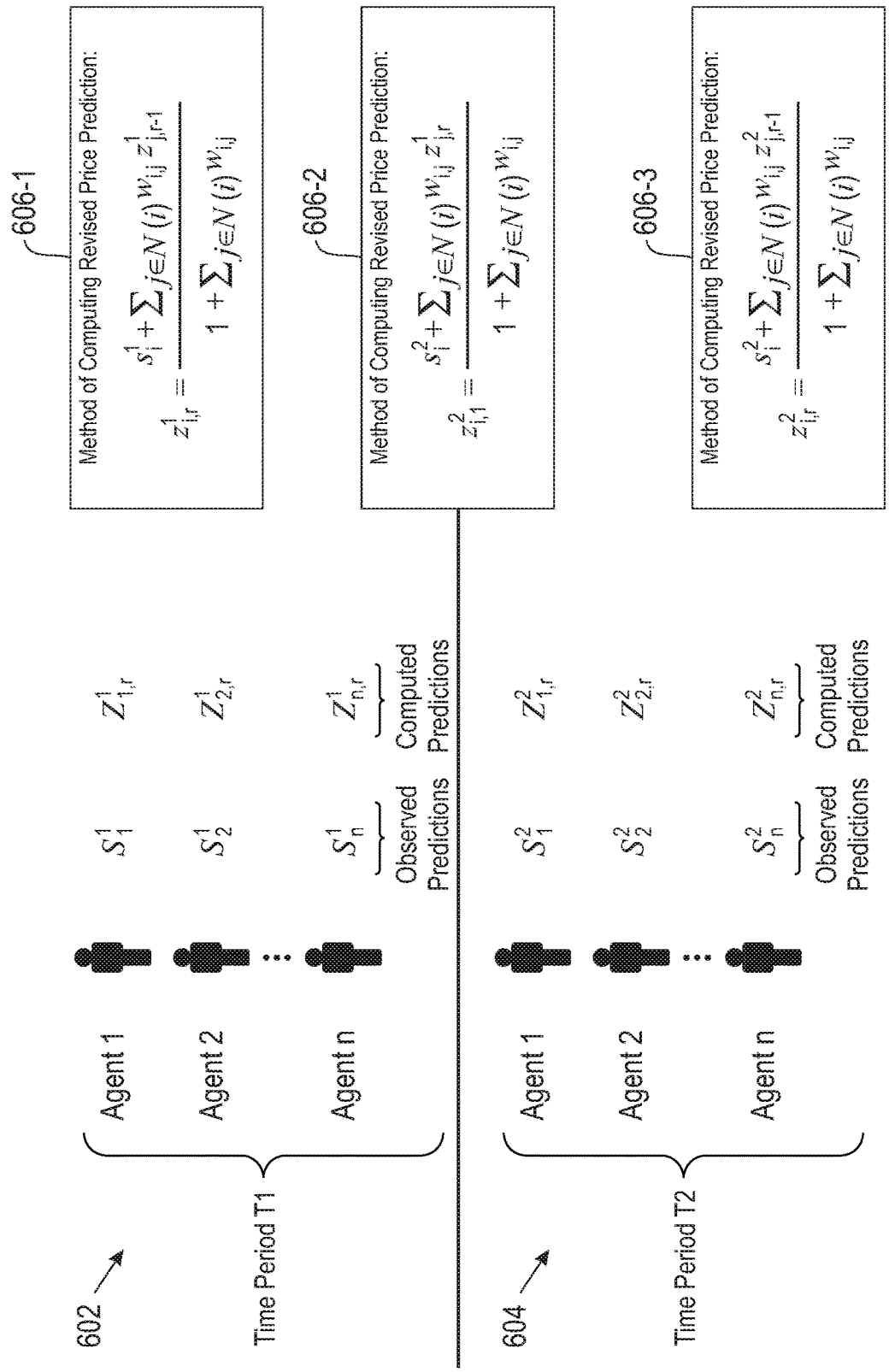
FIG. 6 is a diagram illustrating an example model of collaborative opinion dynamics, according to an exemplary embodiment of the invention.

FIG. 6 is a diagram illustrating an example model of collaborative opinion dynamics, according to an exemplary embodiment of the invention. By way of illustration, FIG. 6 depicts platform communication round 602 at time period T1 among agents 1, 2, . . . , n. Additionally, FIG. 6 depicts platform communication round 604 at time period T2 among agents 1, 2, . . . , n. Equations 606-1, 606-2 and 606-3 describe the method by which an agent revises his or her opinion/prediction based on (a) his or her own initial opinion, (b) the revised opinions of his or her fellow participants/agents, and (c) the weights attributed to those fellow participants/agents. In particular, the first equation (606-1) presents the method of computing revised opinions/predictions in the first time period when all of the initial opinions as well as the revised opinions of fellow participants/agents come from the first time period. The second equation (606-2) presents the method of computing revised opinions/predictions in the second time period when the initial opinions come from time period 2 for all of the agents, and the revised opinions of fellow participants/agents come from the first time period. The third equation (606-3) presents the method of computing revised opinions/predictions in the third time period when all of the initial opinions as well as the revised opinions of fellow participants/agents come from the third time period.

In the above methods depicted in FIG. 6, note that the opinions can be in the form of point estimates or probability distributions. Additionally, it is not necessary for all of the agents to observe new predictions in the next time period. Some agents can reiterate a previously-stated opinion/prediction. As such, for each agent who does not observe new signals, $s_1^2 = s_1^1$. Also, in one or more embodiments of the invention, a new time period starts when a pre-defined amount of time elapses, or when at least one agent observes a new prediction from an external source.

The stopping criteria for above collaborative opinion formation procedure can include the following examples. For the case of point estimations:

$$|z_{1,r}^2 - z_{1,r-1}^2| \leq \delta.$$

As used above, $z_{1,r}^2$ indicates the revised opinion of agent 1 in round r and in time period 2. Also $z_{1,r-1}^2$ indicates the revised opinion of agent 1 in round (r−1) and in time period 2. Additionally, the right-hand side symbol ("delta") of the equation indicates the error threshold.

For the case of probability distributions:

$$dist(z_{i,k}{}^t, z_{i,k\_1}{}^{t'}) = \sqrt{JS(z_{i,k}{}^t, z_{i,k\_1}{}^{t'})} \leq \delta$$

where $JS(z_{i,k}{}^t, z_{i,k\_1}{}^{t'}) = [0.5KL(z_{i,k}{}^t \| M) + 0.5 KL(z_{i,k\_1}{}^{t'} \| M)]$ $M = [0.5 z_{i,k}{}^t + 0.5 z_{i,k\_1}{}^{t'}]$ As used in the above equations, $z_{i,k}{}^t$ indicates the revised opinion of agent i in round k and in time period t. $z_{i,k\_1}{}^{t'}$ indicates the revised opinion of agent i in round (k−1) and in time period t. Additionally, dist(,.) is a distance function which computes the difference between its two parameters, and the right-hand side symbol ("delta") of the equation indicates the error threshold. Further, JS(,.) indicates the Jensen-Shannon divergence, which is a method of measuring the similarity between two probability distributions, such as $z_{i,k}{}^t$ and $z_{i,k\_1}{}^{t'}$. Such a measure is also known as information radius or total divergence to the average distribution (M). Additionally, the Kullback-Leibler (KL) divergence (also called relative entropy) is a measure of how one probability distribution is different from a second, reference probability distribution.

Also, as detailed herein, at least one embodiment of the invention includes computing the span of collaborative opinions. For example, at the end of the collaborative decision making process, each agent holds a collaboratively formed opinion. From the profile of these collaboratively formed opinions, there may be different ways to determine the span of the opinions. By way merely of example, one or more embodiments of the invention can include computing the low-valued or minimum of the opinions, and referring to it as L; and computing the high-valued or maximum of the opinions, and referring to it as M. Accordingly, the span of such an example can be defined as [L, M].

By way merely of illustration, consider an example wherein the number of agents=7, and the agents are connected to each other (that is, a complete graph of communication). Also, as used below, "IntOps" refers to intrinsic opinions, and "RevOps" refers to revised opinions.
IntOps: 1892.5; 1722.56; 1843.15; 1783.48; 1827.93; 1794.28; 1991.71.
Round 1 RevOps: 1836.51; 1836.51; 1836.51; 1836.51; 1836.51; 1836.51; 1836.51
Round 2 RevOps: 1844.51; 1820.23; 1837.46; 1828.94; 1835.29; 1830.48; 1858.68
Round 3 RevOps: 1843.37; 1822.56; 1837.33; 1830.02; 1835.46; 1831.34; 1855.52
Round 4 RevOps: 1843.53; 1822.23; 1837.34; 1829.86; 1835.44; 1831.22; 1855.97
Round 5 RevOps: 1843.51; 1822.28; 1837.34; 1829.89; 1835.44; 1831.24; 1855.91
Round 6 RevOps: 1843.51; 1822.27; 1837.34; 1829.88; 1835.44; 1831.23; 1855.91

Accordingly, in such an example, the opinion span (predicted price range) can be represented as [1822.27; 1855.91].

Figure 7:
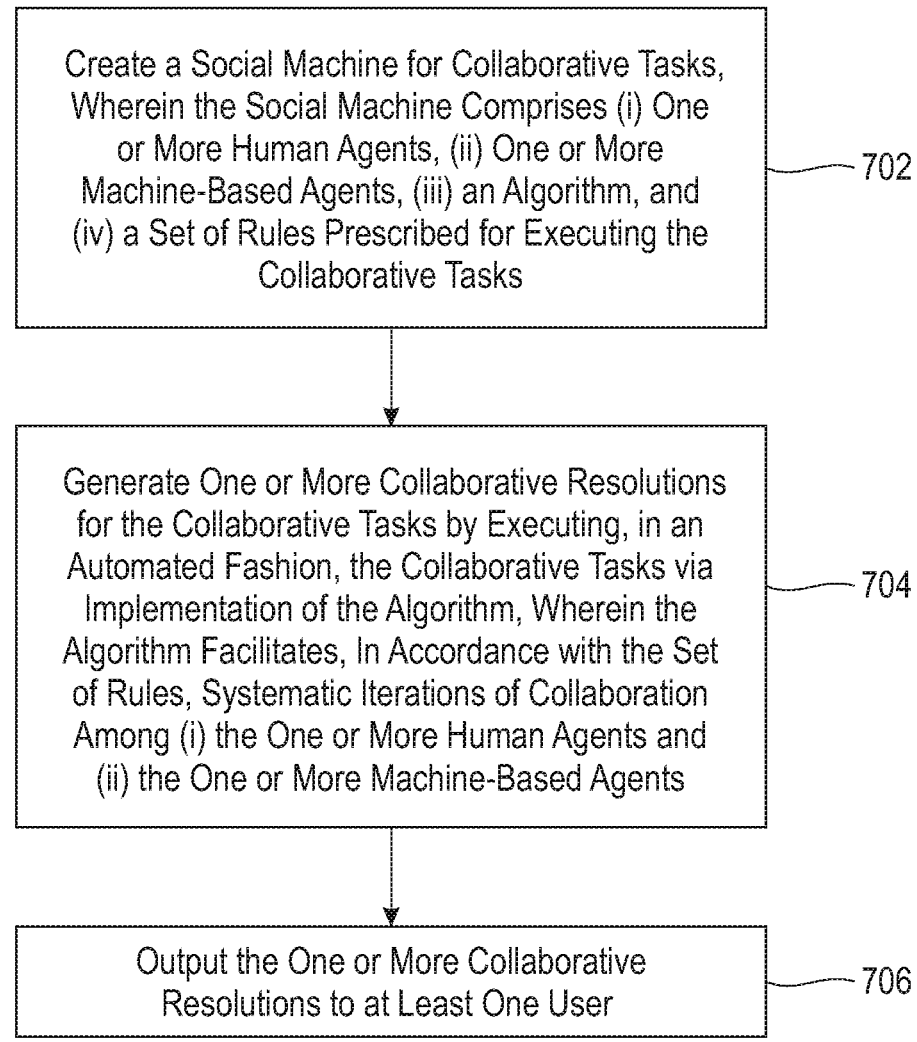
FIG. 7 is a flow diagram illustrating techniques according to an embodiment of the invention.

FIG. 7 is a flow diagram illustrating techniques according to an embodiment of the present invention. Step 702 includes creating a social machine for one or more collaborative tasks, wherein the social machine comprises (i) one or more human agents, (ii) one or more machine-based agents, (iii) at least one algorithm, and (iv) a set of rules prescribed for executing the one or more collaborative tasks. The set of rules can include one or more memory constraints, one or more temporal constraints, one or more energy-related constraints, the number of systematic iterations of collaboration among the human agents and the machine-based agents, a defined set of human agent qualifications, and/or a defined set of machine-based agent qualifications.

Step 704 includes generating one or more collaborative resolutions for the one or more collaborative tasks by executing, in an automated fashion, the one or more collaborative tasks via implementation of the at least one algorithm, wherein the at least one algorithm facilitates, in accordance with the set of rules, systematic iterations of collaboration among (i) the one or more human agents and (ii) the one or more machine-based agents. The at least one algorithm can include at least one predictive algorithm and/or at least one prescriptive algorithm.

Additionally, executing can include implementing, via the at least one algorithm, one or more game theoretic approaches. Also, the systematic iterations of collaboration can include one or more instances of collaborative learning through peer influence within the social machine and/or one or more instances of online intrinsic learning via one or more observed signals from at least one online source external to the social machine.

Step 706 includes outputting the one or more collaborative resolutions to at least one user.

Also, an additional embodiment of the invention includes executing, in an automated fashion, the one or more collaborative tasks via implementation of systematic iterations of collaboration among (i) the one or more human agents and (ii) the one or more machine-based agents, wherein the systematic iterations of collaboration comprise: a first iteration comprising an initial opinion attributed to each agent in the social machine; and one or more subsequent iterations comprising one or more revised opinions attributed to each agent in the social machine, wherein each of the revised opinions is based on at least one of (i) one or more instances of collaborative learning through peer influence within the social machine and (ii) one or more instances of online intrinsic learning via one or more observed signals from at least one online source external to the social machine. Such an embodiment can also include generating a span of collaborative opinion for the one or more collaborative tasks based at least in part on the systematic iterations of collaboration, and outputting the span of collaborative opinion to at least one user.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
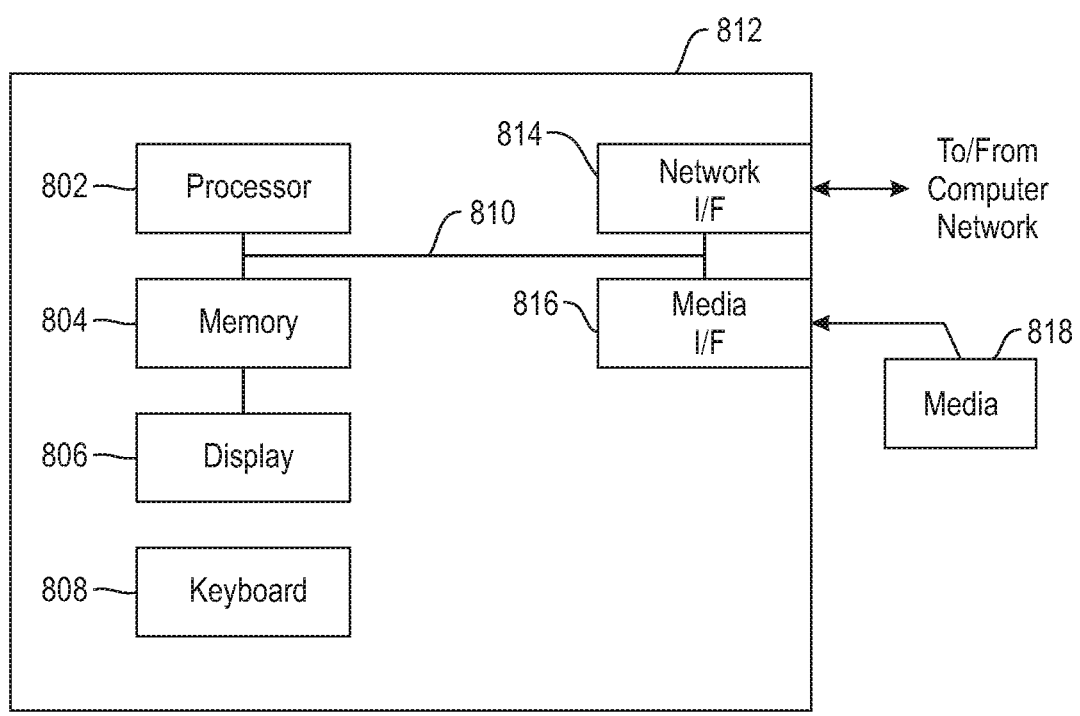
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
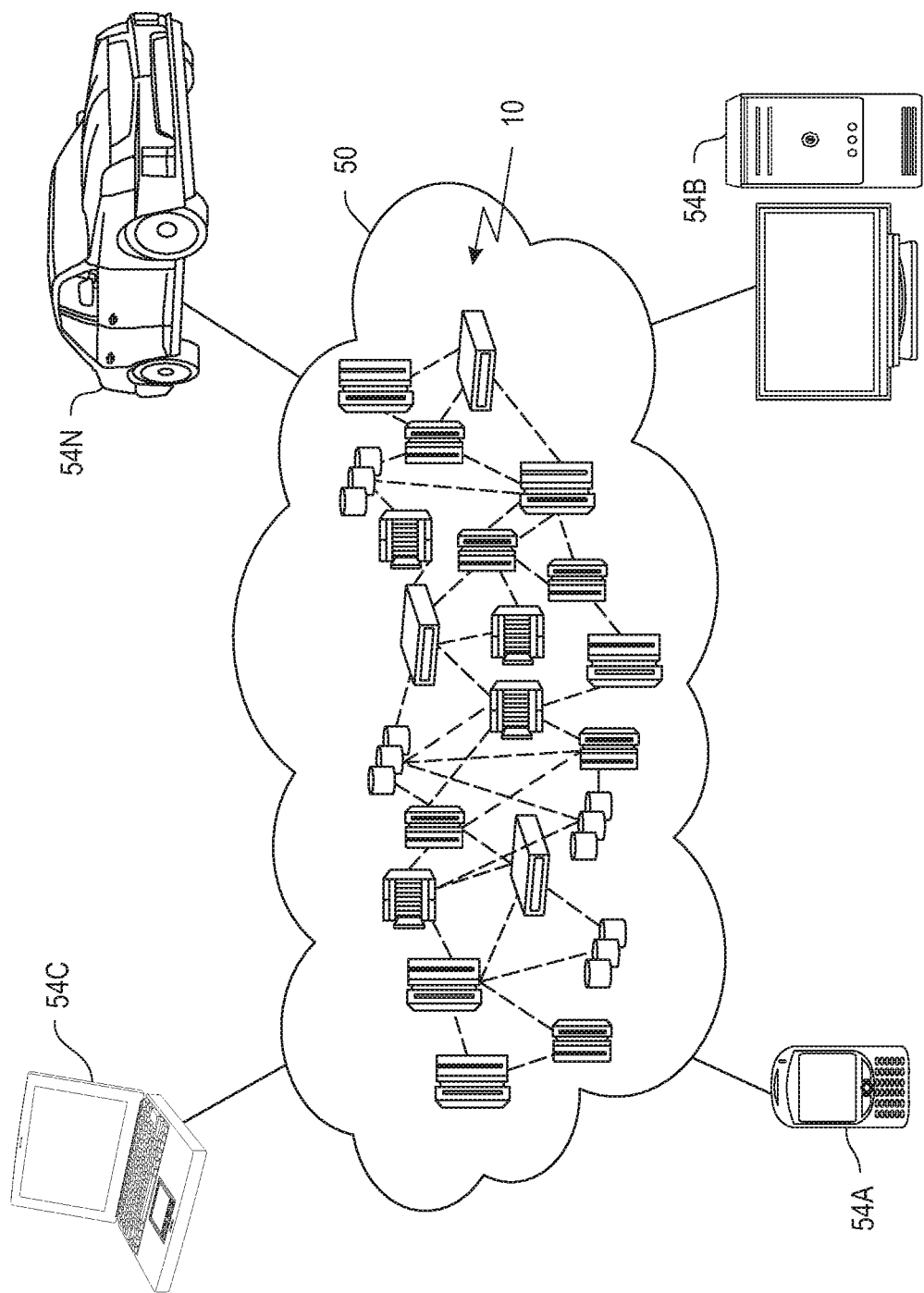
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
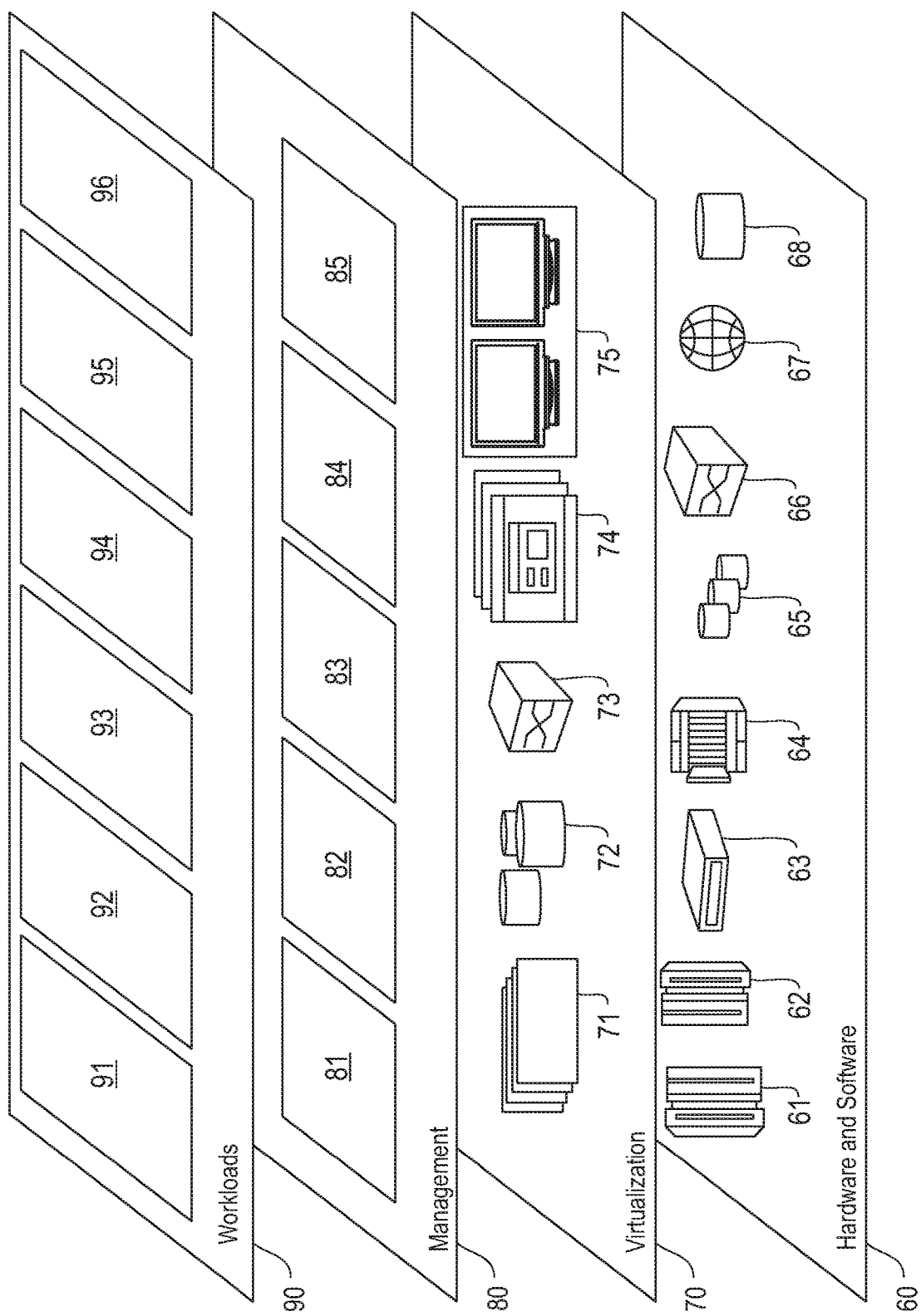
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative cognition platform 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, executing a collaborative task in an automated fashion, facilitating collaboration among autonomous agents using game theoretic approaches.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   providing a collaborative cognition architecture for creating and hosting one or more social machines;
   obtaining, by the collaborative cognition architecture, a request to create a social machine;
   creating the social machine for one or more collaborative tasks based at least in part on the request, wherein the social machine is created on a task execution environment of the collaborative cognition architecture and comprises (i) one or more human agents, (ii) one or more machine-based agents, (iii) at least one algorithm, and (iv) a set of rules prescribed for executing the one or more collaborative tasks, and wherein the task execution environment comprises at least one representational state transfer application programming interface that facilitates interaction between at least the one or more machine-based agents and the task execution environment, and wherein the set of rules comprises one or more memory constraints;
   generating one or more collaborative resolutions for the one or more collaborative tasks by executing, in an automated fashion, the one or more collaborative tasks via implementation of the at least one algorithm using the task execution environment, wherein the at least one algorithm facilitates, in accordance with the set of rules, systematic iterations of collaboration among (i) the one or more human agents and (ii) the one or more machine-based agents, wherein the executing comprises maintaining information of the executing one or more collaborative tasks in a first database of the task execution environment and outputting, via the at least one representational state transfer application programming interface, activities performed by each of the one or more machine-based agents for each of the systematic iterations of collaboration to a second database, wherein the activities are performed by each of the one or more machine-based agents while adhering to the one or more memory constraints; and
   outputting the one or more collaborative resolutions to at least one user;
   wherein the method is carried out by at least one computing device.

2. The computer-implemented method of claim 1, wherein the set of rules comprises at least one of:
   one or more temporal constraints; and
   one or more energy-related constraints.

3. The computer-implemented method of claim 1, wherein the set of rules comprises the number of systematic iterations of collaboration among (i) the one or more human agents and (ii) the one or more machine-based agents.

4. The computer-implemented method of claim 1, wherein the set of rules comprises a defined set of human agent qualifications.

5. The computer-implemented method of claim 1, wherein the set of rules comprises a defined set of machine-based agent qualifications.

6. The computer-implemented method of claim 1, wherein the at least one algorithm comprises at least one predictive algorithm.

7. The computer-implemented method of claim 1, wherein the at least one algorithm comprises at least one prescriptive algorithm.

8. The computer-implemented method of claim 1, wherein said executing comprises implementing, via the at least one algorithm, one or more game theoretic approaches.

9. The computer-implemented method of claim 1, wherein the systematic iterations of collaboration comprise one or more instances of collaborative learning through peer influence within the social machine.

10. The computer-implemented method of claim 1, wherein the systematic iterations of collaboration comprise one or more instances of online intrinsic learning via one or more observed signals from at least one online source external to the social machine.

11. The computer-implemented method of claim 1, wherein the systematic iterations of collaboration comprise at least one instance of a given one of the one or more machine-based agents learning information used by at least one of: another one of the one or more machine-based agents and one of the one or more human agents, wherein the given machine-based agent subsequently uses the learned information in the systematic iterations of collaborations.

12. A computer program product comprising a computer readable storage medium having program instructions embodied therewith, the program instructions executable by a computing device to cause the computing device to:
   provide a collaborative cognition architecture for creating and hosting one or more social machines;
   obtain, by the collaborative cognition architecture, a request to create a social machine;
   create the social machine for one or more collaborative tasks based at least in part on the request, wherein the social machine is created on a task execution environment of the collaborative cognition architecture and comprises (i) one or more human agents, (ii) one or more machine-based agents, (iii) at least one algorithm, and (iv) a set of rules prescribed for executing the one or more collaborative tasks, and wherein the task execution environment comprises at least one representational state transfer application programming interface that facilitates interaction between at least the one or more machine-based agents and the task execution environment, and wherein the set of rules comprises one or more memory constraints;
   generate one or more collaborative resolutions for the one or more collaborative tasks by executing, in an automated fashion, the one or more collaborative tasks via implementation of the at least one algorithm using the task execution environment, wherein the at least one algorithm facilitates, in accordance with the set of rules, systematic iterations of collaboration among (i) the one or more human agents and (ii) the one or more machine-based agents, wherein the executing comprises maintaining information of the executing one or more collaborative tasks in a first database of the task execution environment and outputting, via the at least one representational state transfer application programming interface, activities performed by each of the one or more machine-based agents for each of the systematic iterations of collaboration to a second database, wherein the activities are performed by each of the one or more machine-based agents while adhering to the one or more memory constraints; and output the one or more collaborative resolutions to at least one user.

13. The computer program product of claim 12, wherein the set of rules comprises at least one of (i) one or more temporal constraints and (ii) one or more energy-related constraints.

14. The computer program product of claim 12, wherein the at least one algorithm comprises at least one of (i) a predictive algorithm and (ii) a prescriptive algorithm.

15. The computer program product of claim 12, wherein the set of rules comprises at least one of (i) a defined set of human agent qualifications and (ii) a defined set of machine-based agent qualifications.

16. The computer program product of claim 12, wherein the systematic iterations of collaboration comprise one or more instances of collaborative learning through peer influence within the social machine.

17. The computer program product of claim 12, wherein the systematic iterations of collaboration comprise one or more instances of online intrinsic learning via one or more observed signals from at least one online source external to the social machine.

18. A system comprising:
a memory; and
at least one processor operably coupled to the memory and configured for:
providing a collaborative cognition architecture for creating and hosting one or more social machines;
obtaining, by the collaborative cognition architecture, a request to create a social machine;
creating the social machine for one or more collaborative tasks based at least in part on the request, wherein the social machine is created on a task execution environment of the collaborative cognition architecture and comprises (i) one or more human agents, (ii) one or more machine-based agents, (iii) at least one algorithm, and (iv) a set of rules prescribed for executing the one or more collaborative tasks, and wherein the task execution environment comprises at least one representational state transfer application programming interface that facilitates interaction between at least the one or more machine-based agents and the task execution environment, and wherein the set of rules comprises one or more memory constraints;
generating one or more collaborative resolutions for the one or more collaborative tasks by executing, in an automated fashion, the one or more collaborative tasks via implementation of the at least one algorithm using the task execution environment, wherein the at least one algorithm facilitates, in accordance with the set of rules, systematic iterations of collaboration among (i) the one or more human agents and (ii) the one or more machine-based agents, wherein the executing comprises maintaining information of the executing one or more collaborative tasks in a first database of the task execution environment and outputting, via the at least one representational state transfer application programming interface, activities performed by each of the one or more machine-based agents for each of the systematic iterations of collaboration to a second database, wherein the activities are performed by each of the one or more machine-based agents while adhering to the one or more memory constraints; and
outputting the one or more collaborative resolutions to at least one user.

19. The system of claim 18, wherein the at least one algorithm comprises at least one of (i) a predictive algorithm and (ii) a prescriptive algorithm.

20. A computer-implemented method, the method comprising:
providing a collaborative cognition architecture for creating and hosting one or more social machines;
obtaining, by the collaborative cognition architecture, a request to create a social machine;
creating the social machine for one or more collaborative tasks based at least in part on the request, wherein the social machine is created on a task execution environment of the collaborative cognition architecture and comprises (i) one or more human agents, (ii) one or more machine-based agents, and (iii) a set of rules prescribed for executing the one or more collaborative tasks, and wherein the task execution environment comprises at least one representational state transfer application programming interface that facilitates interaction between at least the one or more machine-based agents and the task execution environment, and wherein the set of rules comprises one or more memory constraints;
executing, in an automated fashion, the one or more collaborative tasks via implementation of systematic iterations of collaboration among (i) the one or more human agents and (ii) the one or more machine-based agents using the task execution environment, wherein the executing comprises maintaining information of the executing one or more collaborative tasks in a first database of the task execution environment and outputting, via the at least one representational state transfer application programming interface, activities performed by each of the one or more machine-based agents for each of the systematic iterations of collaboration to a second database, wherein the activities are performed by each of the one or more machine-based agents while adhering to the one or more memory constraints and wherein the systematic iterations of collaboration comprise:
a first iteration comprising an initial opinion attributed to each agent in the social machine; and
one or more subsequent iterations comprising one or more revised opinions attributed to each agent in the social machine, wherein each of the revised opinions is based on at least one of (i) one or more instances of collaborative learning through peer influence within the social machine and (ii) one or more instances of online intrinsic learning via one or more observed signals from at least one online source external to the social machine;

generating a span of collaborative opinion for the one or more collaborative tasks based at least in part on the systematic iterations of collaboration; and outputting the span of collaborative opinion to at least one user;

wherein the method is carried out by at least one computing device.

* * * * *